(12) United States Patent
Ewert

(10) Patent No.: US 11,989,944 B2
(45) Date of Patent: May 21, 2024

(54) METHOD FOR SELECTING AN IMAGE DETAIL OF A SENSOR

(71) Applicant: Robert Bosch GmbH, Stuttgart (DE)

(72) Inventor: Marlon Ramon Ewert, Untergruppenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 666 days.

(21) Appl. No.: 17/272,638

(22) PCT Filed: Sep. 4, 2019

(86) PCT No.: PCT/EP2019/073512
§ 371 (c)(1),
(2) Date: Apr. 29, 2021

(87) PCT Pub. No.: WO2020/049013
PCT Pub. Date: Mar. 12, 2020

(65) Prior Publication Data
US 2021/0255330 A1  Aug. 19, 2021

(30) Foreign Application Priority Data
Sep. 6, 2018 (DE) ............... 10 2018 215 136.9

(51) Int. Cl.
*G06V 20/56* (2022.01)
*G01S 7/481* (2006.01)
(Continued)

(52) U.S. Cl.
CPC ............ *G06V 20/56* (2022.01); *G01S 7/4811* (2013.01); *G01S 7/4817* (2013.01); *G01S 17/931* (2020.01); *G06V 10/811* (2022.01); *G06V 20/58* (2022.01)

(58) Field of Classification Search
CPC ...... G06V 20/56; G06V 10/811; G06V 20/58; G06F 18/256
See application file for complete search history.

(56) References Cited

U.S. PATENT DOCUMENTS 9,251,705 B2 * 2/2016 Yoo .................. G08G 1/166
9,442,489 B2 * 9/2016 Reichel ............. G08G 1/164
(Continued)

FOREIGN PATENT DOCUMENTS

| CN | 107924620 A | 4/2018 |
|----|-------------|--------|
| DE | 10154861 A1 | 5/2003 |

(Continued)

OTHER PUBLICATIONS

International Search Report dated Dec. 6, 2019 in connection with PCT/EP2019/073512.
(Continued)

*Primary Examiner* — Phuoc Tran
(74) *Attorney, Agent, or Firm* — NORTON ROSE FULBRIGHT US LLP; Gerard A. Messina

(57) ABSTRACT

A method for selecting a detail for a surroundings detection by a sensor based on sensor data. The surroundings are detected by at least one additional sensor, and an object recognition is carried out based on the ascertained sensor data of the at least one additional sensor. Pieces of position information from at least one recognized object are transformed into a coordinate system of the sensor, based on the object recognition, and based on the transformed pieces of position information, the sensor uses a detail of a scanning area for the surroundings detection, or an image detail from already detected sensor data, for an evaluation. A control device is also described.

14 Claims, 2 Drawing Sheets

(51) Int. Cl.
    *G01S 17/931*     (2020.01)
    *G06V 10/80*     (2022.01)
    *G06V 20/58*     (2022.01)

(56) References Cited

U.S. PATENT DOCUMENTS

| | | | |
|---|---|---|---|
| 2004/0024498 A1* | 2/2004 | Okamura | G01S 13/931 |
| | | | 701/1 |
| 2018/0067489 A1 | 3/2018 | Oder et al. | |
| 2018/0211394 A1* | 7/2018 | Sergeev | G06T 7/20 |
| 2018/0300563 A1* | 10/2018 | Steinmeyer | G01S 17/931 |

FOREIGN PATENT DOCUMENTS

| | | |
|---|---|---|
| DE | 102013215408 A1 | 3/2015 |
| DE | 102015204529 A1 | 9/2016 |
| JP | 2004085337 A | 3/2004 |
| JP | 2004125795 A | 4/2004 |
| JP | 2012185540 A | 9/2012 |
| WO | 2017159382 A1 | 9/2017 |

OTHER PUBLICATIONS

Lange et al., "Online vehicle detection using deep neural networks and lidar based preselected image patches," 2016 EEE Intelligent Vehicles Symposium (IV), Jun. 1, 2016, pp. 954-959.

Jia, et al.: "Target Recognition Method Based on Fusion of Vision and LIDAR Information," Fire Control & Command Control, 43(6), (2018), pp. 57-65.

* cited by examiner

METHOD FOR SELECTING AN IMAGE DETAIL OF A SENSOR

FIELD

The present invention relates to a method for selecting a detail for a surroundings detection by a sensor based on sensor data, and a control unit.

BACKGROUND INFORMATION

Beginning with a certain degree of automation, vehicles with automated driving functions may be operated autonomously and without a driver. The vehicle may, for example, automatically follow a roadway pattern, independently recognize other road users or obstacles, and compute the appropriate control commands in the vehicle and relay them to actuators in the vehicle, as the result of which the driving pattern of the vehicle is correctly influenced. For a fully autonomous vehicle, the driver does not take part in the driving operation.

Presently available vehicles have only a limited capability for autonomously acting in a public traffic area. In particular, there is the regulatory limitation that the vehicle driver him/herself must be able to intervene in the driving operation at any time. This makes the implementation of autonomous vehicles more difficult. However, systems of various manufacturers which allow autonomous or semi-autonomous driving are already in test phases.

At the present time, various sensors are already being used in autonomous vehicles for detecting the surroundings of the vehicle. Based on algorithms, the sensor data may be evaluated, and for example objects in the surroundings may be detected.

SUMMARY

An object underlying the present invention includes providing a method for speeding up an evaluation of sensor data.

This object may be achieved with the aid of an example embodiment of the present invention. Advantageous embodiments of the present invention are described herein.

According to one aspect of the present invention, a method for selecting a detail for a surroundings detection by a sensor, based on sensor data, is provided. In accordance with an example embodiment of the present invention, the surroundings are detected by at least one additional sensor. An object recognition is carried out based on the ascertained sensor data of the at least one additional sensor. Based on the object recognition, pieces of position information from at least one recognized object are ascertained and transformed into a coordinate system of the sensor, the sensor, based on the transformed system information, using a detail of a scanning area for the surroundings detection, or an image detail from already detected sensor data, for an evaluation.

One or multiple relevant image details that are used for a surroundings detection and/or an evaluation of the sensor data may thus be ascertained. A relevant image detail is, for example, the image detail in a LIDAR scan that contains relevant object data from the surroundings of an autonomous vehicle. By use of the method, a preselection of the relevant image detail of the sensor data may be made with the aid of further or additional surroundings sensors, for example radar sensors, LIDAR sensors, camera sensors, and the like. The sensor, which may be speeded up and optimized, may be designed as a LIDAR sensor or as a radar sensor, for example.

By the use of additional sensors, a selection of a relevant image detail or of certain pixels may be carried out quickly and efficiently with regard to relevant objects in the vicinity of the sensor.

In one specific embodiment of the present invention, the selection of relevant pixels or of an image detail for a sensor may take place with the aid of sensor data, for example camera data of a vehicle. For example, a camera may already include object recognition, this object recognition operating reliably with a certain likelihood. If relevant objects within the camera image are recognized, they may be initially located with respect to a vehicle coordinate system or a camera coordinate system. In a next step, the recognized object may be transformed into a coordinate system, resulting in the relevant pixels or the relevant image detail for this object in a detection range of the sensor or a scanning range of the sensor.

In a further specific embodiment of the present invention, the selection of the relevant image detail of the sensor may be carried out using data of further surroundings sensors, for example radar sensors, ultrasonic sensors, and further surroundings sensors installed in the vehicle.

The sensor may be a LIDAR sensor, for example, but may also be any other sensor such as a radar sensor, a camera sensor, and the like. For example, the method may also be carried out in the reverse direction, in that objects are initially recognized by a LIDAR sensor and subsequently used in further surroundings sensors for the selection of relevant image details. In addition, an arbitrary combination of surroundings sensors may be selected for implementing the method.

The method in particular has the following advantages:
  The reliability of an autonomous vehicle may be increased due to the rapid and targeted object recognition or object plausibility checking on a further, redundant surroundings sensor.
  The surroundings sensors installed in the vehicle may cooperate closely with one another for detecting the surroundings of the vehicle.
  By use of the method, an all-encompassing consideration of the vehicle surroundings over time may be implemented for all relevant surroundings sensors.
  If only the relevant image detail of a redundant surroundings sensor is considered for an object recognition, this surroundings sensor may have a less powerful design, since not all pixels or all input data of the surroundings sensor also have to be transmitted or analyzed.
  The coordinate transformation of an object that is recognized by a surroundings sensor, together with the object dimensions, into a target coordinate system of a further surroundings sensor and the subsequent data transmission on this surroundings sensor or processing of the same data from the sensor data of the at least one additional sensor may take place with a focus on speed, and does not require as much processing capacity. In addition, a load on a bus system of the vehicle may be kept low for implementing the method.

According to one specific embodiment of the present invention, the position information from the at least one recognized object includes object dimensions and an object position in a sensor or vehicle coordinate system. The data transmission between the sensors may include the object dimensions of the object that is recognized in the camera system, for example, and the position of this object in the coordinate system of the camera. Based on the known relative arrangement of the sensors with respect to one another, these pieces of position information may be utilized to compute a detail in which the sensor may likewise detect the object already ascertained by the additional sensor. The data transmission may thus have a very streamlined design. With the aid of a computer program or intelligent algorithm or with the aid of an artificial intelligence, in a further step the selection of this relevant object from the image data of the sensor may take place by analyzing only the relevant image detail or the relevant pixels from a sensor scan with the aid of the algorithm or the AI. In this way, the object recognition by the sensor may take place much more quickly and less processing capacity is required, since only the relevant image detail or the pixel data that are relevant at that moment is/are evaluated.

According to a further exemplary embodiment of the present invention, the LIDAR sensor, based on transformed pieces of position information from multiple sensors, uses at least one image detail from already detected sensor data for an evaluation. The selection of the relevant image detail in the sensor may thus take place with the aid of data of multiple additional surroundings sensors in a combination.

For example, one or multiple recognized objects of a camera and of a radar sensor may be used in a LIDAR sensor for a targeted selection of an image detail or for a plausibility check.

According to a further exemplary embodiment of the present invention, the transformation of the pieces of position information is carried out by a central control unit or by a sensor control unit. The transformation of the pieces of position information of the recognized object from the camera coordinate system of the at least one additional sensor into a coordinate system of the sensor, for example a LIDAR sensor, may thus take place. The transformation may take place, for example, on a central vehicle computer or within a processor of the sensor or of the additional sensors. The sensors may be in communication connection with one another either directly, or indirectly via a vehicle control unit with the aid of a vehicle bus, for example FlexRay, Ethernet, CAN, or a wireless interface.

According to a further embodiment of the present invention, the transformation of the pieces of position information is carried out by the additional sensor, direct communication links being established between the sensors. The method may thus be carried out in a decentralized manner.

According to a further exemplary embodiment of the present invention, the pieces of position information from at least one object, provided by the at least one sensor, are changed over time for tracking the at least one object. The objects that are recognized by a camera, for example, may be tracked over time and continuously or cyclically transmitted to the sensor for selecting the relevant image detail. In particular, the pieces of position information concerning the tracked object may be transmitted. This may be carried out even if the object has already left the relevant image detail of a camera or of the at least one additional sensor. For example, an object is no longer situated ahead of the vehicle, for example, and therefore is no longer visible to a front camera (additional sensor), but instead is still visible only to a sensor (LIDAR sensor) situated at the side of the vehicle. The LIDAR sensor obtains the relevant image detail by extrapolating a camera image flow beyond the camera pixels, transmitted based on the instantaneous vehicle velocity, and thus tracks the object at the side of the vehicle in a targeted manner.

According to a further exemplary embodiment of the present invention, a temporally variable adaptation of the pieces of position information of the at least one object is continued outside a scanning area of the at least one sensor. For example, an object may be recognized with the aid of a front camera installed in the vehicle. This object is subsequently passed by the vehicle, which means that the vehicle laterally travels past the object. In this case, the relevant object may be stored in a buffer memory of a vehicle computer or of a control unit, and may be further transformed into a coordinate system of the sensor or of the LIDAR sensor with the aid of the vehicle velocity or vehicle dynamics or a highly accurate vehicle position in the world, even upon leaving the relevant image detail of the camera. The pieces of positon information of the object may thus be relayed to a LIDAR sensor installed at the side of the vehicle. This takes place, for example, until the object in question has been reliably recognized by the LIDAR sensor installed at the side of the vehicle. In this case, the LIDAR sensor may supply feedback to the vehicle computer in question or to the camera system itself. In particular, the information may be transmitted that the object in question has once again been found at the side of the vehicle. The buffered object data or pieces of position information of the objects that have continuously been further transformed into the corresponding coordinate system may subsequently be deleted. The laterally installed LIDAR sensor may now carry out its object recognition independently.

According to a further exemplary embodiment of the present invention, the at least one image detail of the detected sensor data of the LIDAR sensor that is used for the evaluation is selected based on sensor data of a position sensor and the data of a map. The selection of a relevant image detail, for example in a LIDAR sensor, takes place with the aid of data of at least one GNSS sensor or with the aid of a position of a vehicle on a highly accurate map. For example, the vehicle knows its position within the area with a high level of accuracy. In addition, the features or important structures around the vehicle are known due to mapping of the highly accurate vehicle position on a map. One application for this specific embodiment of the present invention is the targeted recognition of a pedestrian on the right or left side of a zebra crossing. For example, the autonomous vehicle knows that it is approaching a zebra crossing at the moment. Via the distance from and orientation with respect to this zebra crossing, targeted pieces of image information of the LIDAR sensor relative to this zebra crossing may be selected from the corresponding scan of the LIDAR sensor in which pedestrians may theoretically be situated. This may, for example, be to the left of the zebra crossing, on the zebra crossing, or to the right of the zebra crossing. For this purpose, a transformation of the relative position of the zebra crossing into the coordinate system of the LIDAR sensor takes place, using the dimensions of the zebra crossing as well as the possible positions of pedestrians. The LIDAR sensor may now select in a targeted manner the image details which at this point in time are relevant for a pedestrian recognition. Further possible applications are the recognition of laterally parked vehicles in an urban area or the recognition of structures, already present on the map, for orientation or positioning of the vehicle in the world.

According to a further exemplary embodiment of the present invention, the at least one image detail of the detected sensor data of the LIDAR sensor that is used for the evaluation is selected based on position data of at least one road user. According to a further specific embodiment, position data of the at least one road user are transmitted via a direct or indirect communication link. The selection of a relevant image detail, for example in a LIDAR sensor, may thus be transmitted via a car-to-X communication link with the aid of received position data of further road users. In this case, the host vehicle may receive the dimensions, highly accurate positions, and orientations of the further road users via the car-to-X communication link. These highly accurate positions of the further road users may be transformed into the coordinate system of the sensor in a further step. The selection of the relevant image detail in the sensor for recognizing the at least one further road user subsequently takes place with the aid of the transformed coordinates and the dimensions of just this road user. A plausibility check of position data and orientations of further road users relative to the host vehicle, received via the car-to-X communication, is thus possible.

According to a further specific embodiment of the present invention, the at least one image detail of the detected sensor data of the LIDAR sensor is selected by an artificial intelligence. The selection of the relevant image detail may thus be carried out by an artificial intelligence AI, which may be designed as a neural network, for example. For example, this AI may automatically carry out the coordinate transformation of the object to be recognized into the coordinate system of the sensor. Alternatively or additionally, the AI may be responsible for the object recognition relative to the host vehicle with the aid of a camera, a radar sensor, a LIDAR sensor, an ultrasonic sensor, a GNSS sensor, or a car-to-X communication link. In addition, a dedicated AI may be situated on the sensor or a sensor control unit, which, based on the received data (coordinates and dimensions of the object to be recognized), carries out an object recognition or object plausibility check using a preceding selection of a relevant image detail.

According to a further specific embodiment of the present invention, the evaluation carried out by the LIDAR sensor is used for a plausibility check of the object recognition. In this way, the sensor may form a redundancy for the additional sensors.

According to a further specific embodiment of the present invention, the plausibility check is carried out via a request from at least one sensor. The targeted object recognition or object plausibility check of an already recognized object of a further surroundings sensor by the sensor may thus take place with the aid of a request or as needed. For example, an object has been recognized with only a low confidence or certainty by a surroundings sensor. The surroundings sensor now transmits the coordinates and dimensions of the presumably recognized object via a request to the sensor. The sensor may carry out the object recognition once or for a defined time period with the aid of the relevant image detail. For example, if the object is also reliably recognized by the sensor in the relevant image detail after completion of the coordinate transformation, the sensor transmits a response to the further surroundings sensor that the object in question is plausible. The further surroundings sensor may now further track the reliably recognized object for the implementation of the autonomous driving. If the object in question has not been recognized by the sensor, even after multiple attempts, a response to the requesting additional surroundings sensor likewise takes place that the object is implausible. A targeted plausibility check of recognized objects by a sensor is possible with the aid of this specific embodiment of the present invention. This plausibility check may take place within a very short time period, as a result of which the functionality of the autonomous driving is maintained and has greater reliability and safety. For example, the sensor may carry out a general object recognition with the aid of AI or with the aid of an intelligent algorithm for a certain vehicle surroundings, and may carry out an object recognition for a targeted image detail with the aid of the surroundings scan, which is present anyway. The selection of the relevant image detail may take place prior to an object recognition. Alternatively or additionally, the entire image detail of the sensor may be analyzed with regard to this object.

According to a further aspect of the present invention, a control unit for connecting to at least one sensor and for reading out sensor data from at least one sensor is provided, the control unit being configured to carry out all steps of the method.

In accordance with an example embodiment of the present invention, the control unit may in particular be designed as a sensor control unit or as a central control unit. The control unit may be situated internally or externally to the vehicle. All surroundings sensors of a vehicle that are coupled to the control unit may thus transmit sensor data to the control unit via a vehicle bus. The implementation of the method takes place not on the surroundings sensors themselves, but, rather, only on the control unit, which has sufficient processing capacity. Depending on the application, an arbitrary number of sensors may be coupled to the control unit, and within the scope of a sensor fusion the accuracy of the evaluation and of the method may thus be improved.

Preferred exemplary embodiments of the present invention are explained in greater detail below with reference to greatly simplified schematic illustrations.

DETAILED DESCRIPTION OF EXAMPLE EMBODIMENTS

Figure 1:
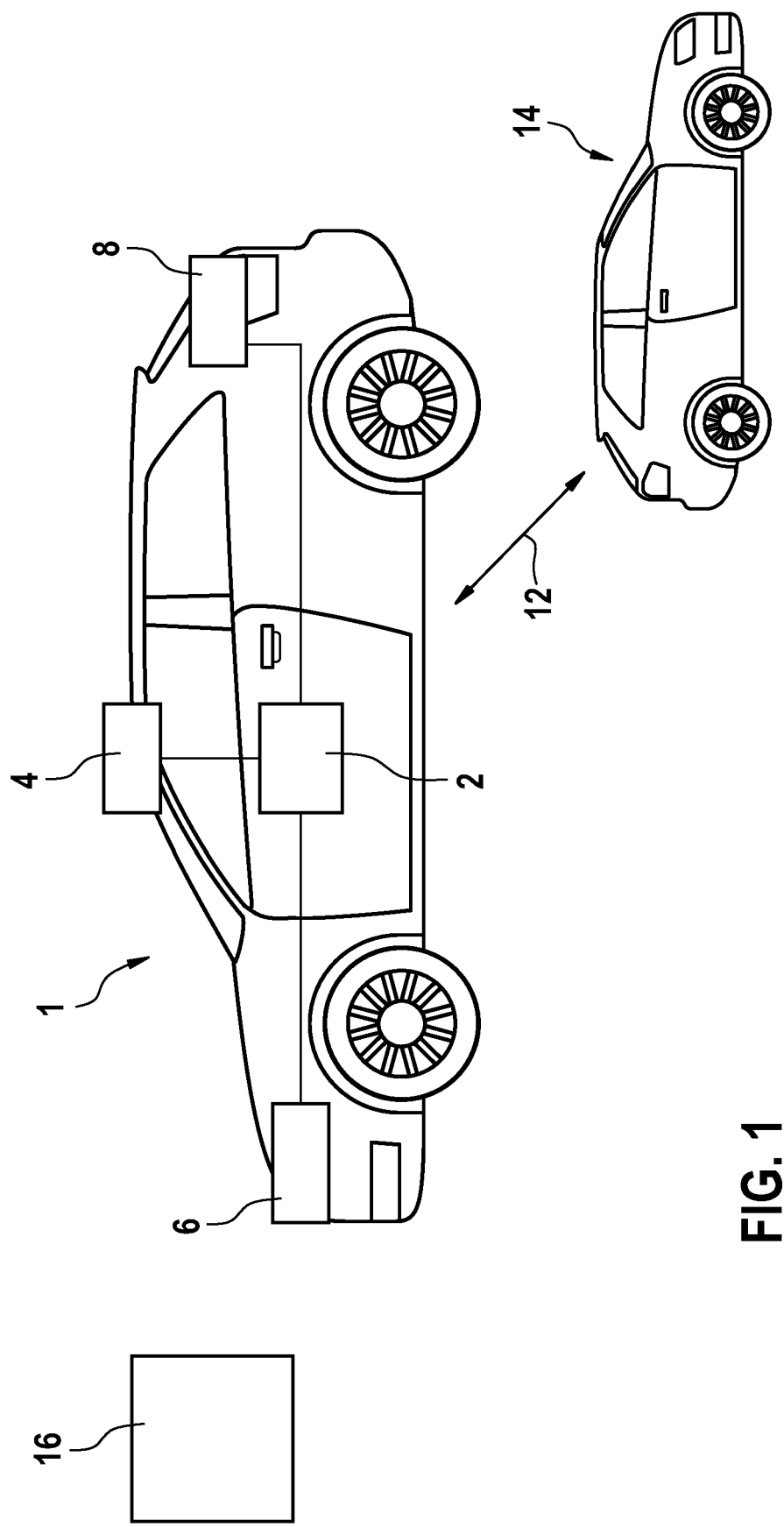
FIG. 1 shows a schematic illustration of a vehicle that includes a control unit and sensors, in accordance with an example embodiment of the present invention.

FIG. 1 illustrates a schematic illustration of a vehicle 1 that includes a control unit 2 and sensors 4, 6, 8. Vehicle 1 is an automatedly operable vehicle 1 that includes at least one control unit 2.

Control unit 2 is coupled to sensors 4, 6, 8 in such a way that it may read out and further process the sensor data. The sensor system of vehicle 1 is made up of a LIDAR sensor 4 and additional sensors 6, 8. Additional sensors 6, 8 are designed as a camera 6 and a radar sensor 8.

Control unit 2 includes a communication unit for establishing a communication link 12. Communication link 12 may be a car-2-X communication link, for example, via which other road users 14 may exchange their position and further data with control unit 2.

Objects 16 in the surroundings of vehicle 1 may be ascertained by sensors 4, 6, 8.

Figure 2:
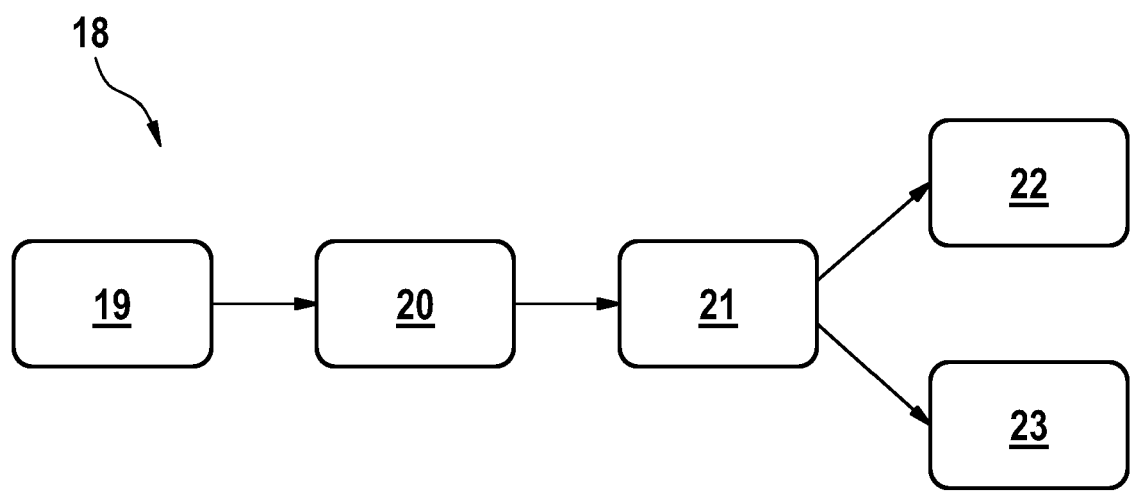
FIG. 2 shows a schematic flowchart of a method according to one specific embodiment of the present invention.

FIG. 2 shows a schematic flowchart of a method 18 according to one specific embodiment.

Method 18 is used in particular for selecting a detail for a surroundings detection by a sensor 4, based on sensor data of additional sensors 6, 8.

The surroundings are detected by at least one additional sensor 6, 8 in a step 19. An object recognition 20 is carried out based on the ascertained sensor data of the at least one sensor 6, 8. Based on object recognition 20, pieces of position information from at least one recognized object 16 are transformed 21 into a coordinate system of sensor 4. Based on the transformed pieces of position information, a detail of a scanning area of sensor 4 for surroundings detection 22, or an image detail of the sensor data of the sensor 4 from already detected sensor data, is used 23 for an evaluation.

What is claimed is:

1. A method for selecting a detail for a surroundings detection by a sensor based on sensor data, the method comprising:
   detecting surroundings by at least one additional sensor to provide ascertained sensor data;
   carrying out an object recognition based on the ascertained sensor data of the at least one additional sensor;
   transforming pieces of position information of at least one recognized object into a coordinate system of the sensor; and
   using, based on the object recognition, and based on the transformed pieces of position information, for an evaluation, by the sensor an image detail from already detected sensor data of the sensor;
   wherein the pieces of position information include object dimensions and an object position in the sensor or the coordinate system, wherein data transmission between the sensors includes the pieces of information, wherein based on a relative arrangement of the sensors, the pieces of position information are used to compute the image detail in which the sensor detects the object ascertained by the additional sensor.

2. The method as recited in claim 1, wherein the sensor uses at least one image detail from the already detected sensor data for the evaluation, based on transformed pieces of position information from multiple additional sensors.

3. The method as recited in claim 1, wherein the transformation of the pieces of position information is carried out by a central control unit or by a sensor control unit.

4. The method as recited in claim 1, wherein the transformation of the pieces of position information is carried out by the additional sensor, direct communication links being established between the sensor and the additional sensor.

5. The method as recited in claim 1, wherein the pieces of position information of the at least one object, provided by the at least one sensor, are changed over time for tracking the at least one object.

6. The method as recited in claim 5, wherein a temporally variable adaptation of the pieces of position information of the at least one object is continued outside a scanning area of the at least one additional sensor.

7. The method as recited in claim 1, wherein the at least one image detail of the detected sensor data of the sensor that is used for the evaluation is selected based on additional sensor data of a position sensor and data of a map.

8. The method as recited in claim 1, wherein the at least one image detail of the detected sensor data of the sensor that is used for the evaluation is selected based on position data of at least one road user, the position data of the at least one road user being transmitted via a direct or indirect communication link.

9. The method as recited in claim 1, wherein the at least one image detail of the detected sensor data of the sensor is selected by an artificial intelligence.

10. The method as recited in claim 1, wherein the evaluation carried out by the sensor is used for a plausibility check of the object recognition of the at least one additional sensor.

11. The method as recited in claim 10, wherein the plausibility check is carried out via a request from at least one sensor.

12. The method as recited in claim 1, wherein selection of the object from the image data of the sensor takes place by analyzing only the relevant image detail from a sensor scan.

13. A control unit to connect to at least one sensor and to read out sensor data from the at least one sensor, comprising:
    a control unit configured to select a detail for a surroundings detection by a sensor based on sensor data, and configured to perform the following:
       detecting surroundings using at least one additional sensor to provide ascertained sensor data;
       carrying out an object recognition based on the ascertained sensor data of the at least one additional sensor;
       transforming pieces of position information of at least one recognized object into a coordinate system of the sensor; and
       using, based on the object recognition, and based on the transformed pieces of position information, for an evaluation an image detail from already detected sensor data of the sensor;
       wherein the pieces of position information include object dimensions and an object position in the sensor or the coordinate system, wherein data transmission between the sensors includes the pieces of information, wherein based on a relative arrangement of the sensors, the pieces of position information are used to compute the image detail in which the sensor detects the object ascertained by the additional sensor.

14. The control unit as recited in claim 13, wherein selection of the object from the image data of the sensor takes place by analyzing only the relevant image detail from a sensor scan.

* * * * *